US010317597B2

United States Patent
Cohen et al.

(10) Patent No.: US 10,317,597 B2
(45) Date of Patent: Jun. 11, 2019

(54) LIGHT-FIELD MICROSCOPY WITH PHASE MASKING

(71) Applicant: The Board of Trustees of the Leland Stanford Junior University, Stanford, CA (US)

(72) Inventors: Noy Cohen, Stanford, CA (US); Marc S. Levoy, Stanford, CA (US); Michael J. Broxton, San Francisco, CA (US); Logan Grosenick, Brooklyn, NY (US); Samuel Yang, Stanford, CA (US); Aaron Andalman, San Francisco, CA (US); Karl A. Disseroth, Stanford, CA (US); Mark A. Horowitz, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 298 days.

(21) Appl. No.: 14/828,259

(22) Filed: Aug. 17, 2015

(65) Prior Publication Data

US 2016/0062100 A1 Mar. 3, 2016

Related U.S. Application Data

(60) Provisional application No. 62/042,150, filed on Aug. 26, 2014.

(51) Int. Cl.
*G02B 5/30* (2006.01)
*G02B 3/00* (2006.01)
(Continued)

(52) U.S. Cl.
CPC ......... *G02B 5/3083* (2013.01); *G02B 3/0006* (2013.01); *G02B 21/0056* (2013.01); *G02B 27/0075* (2013.01)

(58) Field of Classification Search
CPC ... G02B 21/361; G02B 3/0006; G02B 5/3083
See application file for complete search history.

(56) References Cited

U.S. PATENT DOCUMENTS 5,852,620 A * 12/1998 Wan .................... G02B 5/3083
                                                    372/22
6,259,807 B1 * 7/2001 Ravkin ............... G01N 15/1475
                                                    382/133

(Continued)

OTHER PUBLICATIONS

D. A. Agard, "Optical sectioning microscopy: cellular architecture in three dimensions," Annual review of biophysics and bioengineering 13, 191-219. (1984). First Page Only.

(Continued)

*Primary Examiner* — Jayanti K Patel
*Assistant Examiner* — Irfan Habib
(74) *Attorney, Agent, or Firm* — KPPB LLP

(57) ABSTRACT

Various aspects of the present disclosure are directed toward optics and imaging. As may be implemented with one or more embodiments, an apparatus includes one or more phase masks that operate with an objective lens and a microlens array to alter a phase characteristic of light travelling in a path from a specimen, through the objective lens and microlens array and to a photosensor array. Using this approach, the specimen can be imaged with spatial resolution characteristics provided via the altered phase characteristic, which can facilitate construction of an image with enhanced resolution.

20 Claims, 5 Drawing Sheets

(51) Int. Cl.
*G02B 21/00* (2006.01)
*G02B 27/00* (2006.01)

(56) References Cited

U.S. PATENT DOCUMENTS

| | | | | |
|---|---|---|---|---|
| 7,011,910 B2* | 3/2006 | Shiota | ............... | G02B 5/3083 |
| | | | | 430/311 |
| 7,180,673 B2* | 2/2007 | Dowski, Jr. | ......... | G02B 5/3083 |
| | | | | 359/637 |
| 7,366,394 B2* | 4/2008 | Takamatsu | ............ | G02B 21/14 |
| | | | | 359/371 |
| 7,414,786 B2* | 8/2008 | Brown | ............... | G02B 5/3083 |
| | | | | 359/490.01 |
| 7,491,928 B2 | 2/2009 | Roichman et al. | | |
| 7,567,596 B2 | 7/2009 | Dantus et al. | | |
| 7,715,099 B2* | 5/2010 | Shih | ......................... | G01J 1/04 |
| | | | | 216/24 |
| 7,723,662 B2 | 5/2010 | Levoy et al. | | |
| 7,897,910 B2 | 3/2011 | Roichman et al. | | |
| 7,973,936 B2 | 7/2011 | Dantus | | |
| 8,254,023 B2* | 8/2012 | Watson | ............... | G02B 21/002 |
| | | | | 359/432 |
| 8,300,669 B2 | 10/2012 | Dantus et al. | | |
| 8,761,534 B2* | 6/2014 | Shroff | ................. | G02B 3/0043 |
| | | | | 382/154 |
| 8,817,115 B1* | 8/2014 | Venkatachalann | ........ | G01J 3/28 |
| | | | | 348/208.4 |
| 9,307,169 B2* | 4/2016 | Kodama | ............... | G01J 3/0208 |
| 9,310,591 B2* | 4/2016 | Hua | ........................ | G02B 13/22 |
| 9,325,947 B2* | 4/2016 | Bridge | .................. | H04N 5/232 |
| 9,420,276 B2* | 8/2016 | Liang | ........................ | G06T 7/80 |
| 9,426,429 B2* | 8/2016 | Zheng | .................... | G02B 21/06 |
| 9,550,455 B2* | 1/2017 | Foley | ...................... | B60Q 11/00 |
| 9,569,664 B2* | 2/2017 | Judkewitz | .......... | G06K 9/00624 |
| 9,628,684 B2* | 4/2017 | Liang | .................... | H04N 5/2254 |
| 9,643,184 B2* | 5/2017 | Zheng | .................... | B01L 3/508 |
| 9,658,443 B2* | 5/2017 | Broxton | ............. | G02B 21/367 |
| 9,693,034 B2* | 6/2017 | Lew | ...................... | H04N 13/204 |
| 9,772,407 B2* | 9/2017 | Cheng | ................. | G01T 1/2002 |
| 9,810,893 B2* | 11/2017 | Backer | .................. | G02B 21/16 |
| 9,881,355 B2* | 1/2018 | Piestun et al. | ..... | G01N 21/6456 |
| 2004/0012872 A1 | 1/2004 | Fleming et al. | | |
| 2006/0056468 A1 | 3/2006 | Dantus | | |
| 2006/0187974 A1 | 8/2006 | Dantus | | |
| 2007/0076199 A1* | 4/2007 | Ode | ......................... | G01J 3/02 |
| | | | | 356/301 |
| 2007/0139784 A1 | 6/2007 | Roichman et al. | | |
| 2008/0266655 A1* | 10/2008 | Levoy | ................. | G02B 21/361 |
| | | | | 359/368 |
| 2009/0146050 A1 | 6/2009 | Roichman et al. | | |
| 2009/0257464 A1 | 10/2009 | Dantus et al. | | |
| 2009/0316237 A1* | 12/2009 | Uno | ......................... | G03H 1/02 |
| | | | | 359/1 |
| 2010/0204459 A1 | 8/2010 | Mason et al. | | |
| 2013/0128077 A1* | 5/2013 | Georgiev | ............. | H04N 5/2254 |
| | | | | 348/231.99 |
| 2013/0128087 A1* | 5/2013 | Georgiev | ............. | H04N 5/2254 |
| | | | | 348/307 |
| 2014/0263963 A1* | 9/2014 | Broxton | ............. | G02B 21/367 |
| | | | | 250/208.1 |
| 2015/0055745 A1 | 2/2015 | Holzner et al. | | |
| 2015/0277092 A1* | 10/2015 | Backer | .................. | G02B 21/16 |
| | | | | 250/237 R |
| 2016/0353082 A1* | 12/2016 | Pitts | ..................... | H04N 13/232 |
| 2017/0085832 A1* | 3/2017 | Drazic | ................. | H04N 5/9201 |

OTHER PUBLICATIONS

I. J. Cox and C. J. R. Sheppard, "Information capacity and resolution in an optical system," J. Opt. Soc. Am. A 3, 1152 (1986). Abstract Only.
M. Pluta, Advanced Light Microscopy, vol. 1. Principles and Basic Properties, (Elsevier, 1988). (Biblio included)—(464 page book).
M Levoy and P Hanrahan. Light field rendering. Proceedings of the 23rd annual conference on Computer graphics and interactive techniques, pp. 31-42, 1996.
J. Goodman, Introduction to Fourier Optics, 2nd ed. (MaGraw-Hill, 1996).—(457 page book).
M. Bertero and C. de Mol, "III Super-resolution by data inversion," in Progress in Optics (Elsevier, 1996) pp. 129-178.—(cover page of book included).
M. Born and E. Wolf, Principles of Optics, 7th ed. (Cambridge University, 1999). book description included.
M. Gu, Advanced Optical Imaging Theory (Springer, 1999). book description included.
P. Nussbaum, R Völkel, H P Herzig, M Eisner, and S Haselbeck. Design, fabrication and testing of microlens arrays for sensors and microsystems. Pure and Applied Optics: Journal of the European Optical Society Part A, 6(6):617, 1997.
A. Egner and S. W. Hell, "Equivalence of the Huygens-Fresnel and Debye approach for the calculation of high aperture point-spread functions in the presence of refractive index mismatch," Journal of Microscopy 193,244-249 (1999).
S. Baker and T. Kanade, "Limits on super-resolution and how to break them," IEEE Trans. Pattern Anal. Mach. Intell. 24. 1167-1183 (2002).
M. R. Arnison and C. J. R. Sheppard, "A 3D vectorial optical transfer function suitable for arbitrary pupil functions," Optics communications 211, 53-63 (2002).
S. Farsiu, D. Robinson, M. Elad, and P. Milanfar. Advances and challenges in super-resolution. International Journal of Imaging Systems and Technology, 14(2):47-57, 2004.
R. Ng, "Fourier slice photography," in Proceedings of ACM SIG-GRAPH (2005). 735-744.
T. Pham, L. van Vliet, and K. Schutte, "Influence of signal-to-noise ratio and point spread function on limits of superresolution," Proc. SPIE 5672, 169-180 (2005).
M. Levoy, R. Ng, A. Adams, M. Footer, and M. Horowitz, "Light field microscopy," in Proceedings of ACM SIGGRAPH. (2006) 924-934.
J M. Bardsley and J. G. Nagy, "Covariance-preconditioned iterative methods for nonnegatively constrained astronomical imaging," SIAM journal on matrix analysis and applications 27, 1184-1197 (2006).
W. Chan, E. Lam, M. Ng, and G. Mak, "Super-resolution reconstruction in a computational compound-eye imaging system," Multidimensional Systems and Signal Processing 18. 83-101. (2007).
R. Niesner, V. Andresen, J. Neumann, and H. Spiecker, "The Power of Single and Multibeam Two-Photon Microscopy for High-Resolution and High-Speed Deep Tissue and Intravital Imaging", Biophysical Journal, vol. 93, Issue 7, p. 2519-2529, Oct. 2007.
Werner Göbel, Bjorn M Kampa, and Fritjof Helmchen, "Imaging cellular network dynamics in three dimensions using fast 3D laser scanning". Nature Methods, 4(1):73-79, 2007.
R. Heintzmann, "Estimating missing information by maximum likelihood deconvolution," Micron 38,136-144 (2007).
T.F. Holekamp, T. Turaga, and T. E. Holy, "Fast Three-Dimensional Fluorescence Imaging of Activity in Neural Populations by Objective-Coupled Planar Illumination Microscopy", Neuron, 57(5):661-672, 2008.
R. Oldenbourg. "Polarized light field microscopy: an analytical method using a microlens array to simultaneously capture both conoscopic and orthoscopic views of birefringent objects". Journal of Microscopy, 231(3):419-432, 2008.
G D. Reddy, K. Kelleher, R. Fink, and P. Saggau, "Three-dimensional random access multiphoton microscopy for functional imaging of neuronal activity", Nature Neuroscience, 11(6):713-720, 2008.
M. Bertero, P. Boccacci, G. Desidera, and G. Vicidomini, "Image deblurring with Poisson data: from cells to galaxies," Inverse Problems 25, 123006 (2009).
M Levoy, Z Zhang, and I McDowell. Recording and controlling the 4D light field in a microscope using microlens arrays. Journal of Microscopy, 235(2):144-162, 2009.
Michael Bass and Virendra N. Mahajan. Handbook of Optics. Third Edition. McGraw-Hill, New York, 2010.—(1000+ page book).

(56) References Cited

OTHER PUBLICATIONS

K. Grochenig and T. Strohmer, "Numerical and theoretical aspects of nonuniform sampling of band-limited images, in Nonuniform Sampling,", F. Marvasti, ed.. Information Technology: Transmission, Processing, and Storage, 283-324 (Springer US, 2010).
Joseph Rosen, Nisan Siegel, and Gary Brooker. Theoretical and experimental demonstration of resolution beyond the Rayleigh limit by FINCH fluorescence microscopic imaging. 19(27):1506-1508, 2011.
T. Bishop and P. Favaro. The Light Field Camera: Extended Depth of Field, Aliasing and Super-resolution. Pattern Analysis and Machine Intelligence, IEEE Transactions on, (99):1-1, 2012.
D. Voelz, Computational Fourier Optics: a MATLAB Tutorial (SPIE Press, 2011). (book description included).
P. Favaro, "A split-sensor light field camera for extended depth of field and superresolution," in "SPIE Conference Series," 8436. (2012). Abstract Only.
S. Abrahamsson, J. Chen, B. Hajj, S. Stallinga, A. Y. Katsov, J. Wisniewski, G. Mizuguchi, P. Soule, F. Mueller, C. D. Darzacq, X. Darzacq, C. Wu, C. I. Bargmann, D. A. Agard, M. G. L. Gustafsson, and M. Dahan, "Fast multicolor 3D imaging using aberration-corrected multifocus microscopy," Nat. Meth. 1-6. (2012). Abstract Only.
S. Shroff and K. Berkner, "Image formation analysis and high resolution image reconstruction for plenoptic imaging systems," Applied optics, 52, D22D31, (2013).
C. H. Lu, S. Muenzel, and J. Fleischer, "High-resolution light-field microscopy," in "Computational Optical Sensing and Imaging, Microscopy and Tomography I (CTh3B)," (2013). Abstract Only.
Michael Broxton, Logan Grosenick, Samuel Yang, Noy Cohen, Aaron Andalman, Karl Deisseroth, and Marc Levoy, "Wave optics theory and 3-D deconvolution for the light field microscope," Opt. Express 21(21), 25418-25439 (2013).
S. Prasad, "Rotating point spread function via pupil-phase engineering," Opt. Lett. 38(4), 585-587 (2013) Abstract Only.
Castro et al., "Integral imaging with large depth of field using an asymmetric phase mask", Optics Express, vol. 15, No. 16, Aug. 6, 2007, pp. 10266-10273.
Cohen et al., "Enhancing the performance of the light field microscope using wavefront coding", Optics Express, Oct. 6, 2014, vol. 22, No. 20, pp. 24817-24839, D01:10.1364/0E.22.024817.
Doblas et al., "Investigation of the Squbic phase mask design for depth-invariant widefield microscopy point-spread function engineering", Proc. SPIE 8949, Three-Dimensional and Multidimensional Microscopy: Image Acquisition and Processing XXI, 2014, 8 pgs.

Dowski et al., "Extended depth of field through wave-front coding", Applied Optics, vol. 34, No. 11, Apr. 10, 1995, pp. 1859-1866.
Levin et al., "4D Frequency Analysis of Computational Cameras for Depth of Field Extension", Proceedings of ACM Siggraph, 97, 2009, 14 pgs.
Lucy, L.B., "An iterative technique for the rectification of observed distributions", The Astronomical Journal, vol. 79, No. 6, Jun. 1974, pp. 745-749.
Marwah et al., "Compressive light field photography using overcomplete dictionaries and optimized projections", ACM Transactions on Graphics, vol. 32, No. 4, 2013, 12 pgs.
Prevedel et al., "Simultaneous whole-animal 3D-imaging of neuronal activity using light-field microscopy", Nat Methods, Jul. 2014, vol. 11, No. 7, pp. 727-730, (author manuscript) Doi: 10.1038/nmeth.2964.
Quirin et al., "Simultaneous imaging of neural activity in three dimensions", Frontiers in Neural Circuits, vol. 8, Article 29, Apr. 3, 2014, 11 pgs.
Richardson, William H., "Bayesian-Based Iterative Method of Image Restoration", Journal of the Optical Society of America, vol. 62, No. 1, Jan. 1972, pp. 55-59.
Abrahamsson et al., "A new approach to extended focus for high-speed, high-resolution biological microscopy", Proc. of SPIE, Feb. 2006, vol. 6090, pp. 60900N-1-60900N-8.
Arnison et al., "Wavefront coding fluorescence microscopy using high aperture lenses", Optical Imaging and Microscopy: techniques and advanced systems, 2003, pp. 143-165.
Greengard et al., "Depth from diffracted rotation", Optics Letters, 2005, vol. 31, No. 2, pp. 181-183.
Yuan et al., "computational optical sectioning microscopy using an engineered PSF with reduced depth variability—Proof of concept", Proc. of the 9th IEEE International Symposium on Biomedical Imaging, 2012, pp. 1739-1742.
Yang et al., "Optimized Phase Pupil Masks for Extended Depth of Field", Opt. Commun., Apr. 2007, vol. 272, No. 1, pp. 56-66.
Zhao et al., "Improved logarithmic phase mask to extend the depth of field of an incoherent imaging system", Optics Letters, 2008, vol. 33, Issue 11, pp. 1171-1173.
Zhao et al., "Optimized sinusoidal phase mask to extend the dept of field of an incoherent imaging system", Optics Letters, Jan. 2010, vol. 35, No. 2, pp. 267-269.
Zhengyun et al., "Wagner distributions and how they relate to the light field", Proc. Int. Conf. Comput. Photography, Apr. 2009, pp. 1-10.
Chen et al., "Interactive deformation of light fields", Symposium on Interactive 3D Graphics, 2005, pp. 139-146.
NG, "Digital Light Field Photography", Thesis, Jul. 2006, 203 pgs.

\* cited by examiner

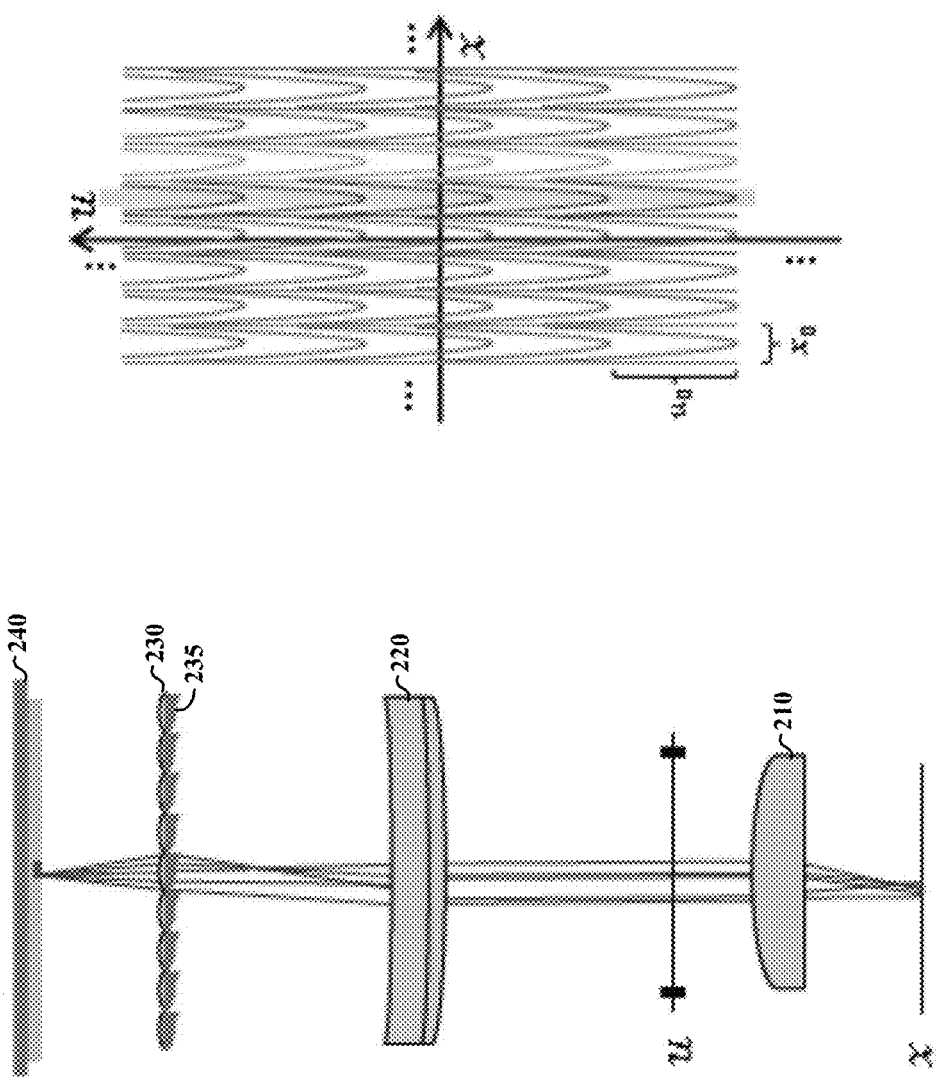

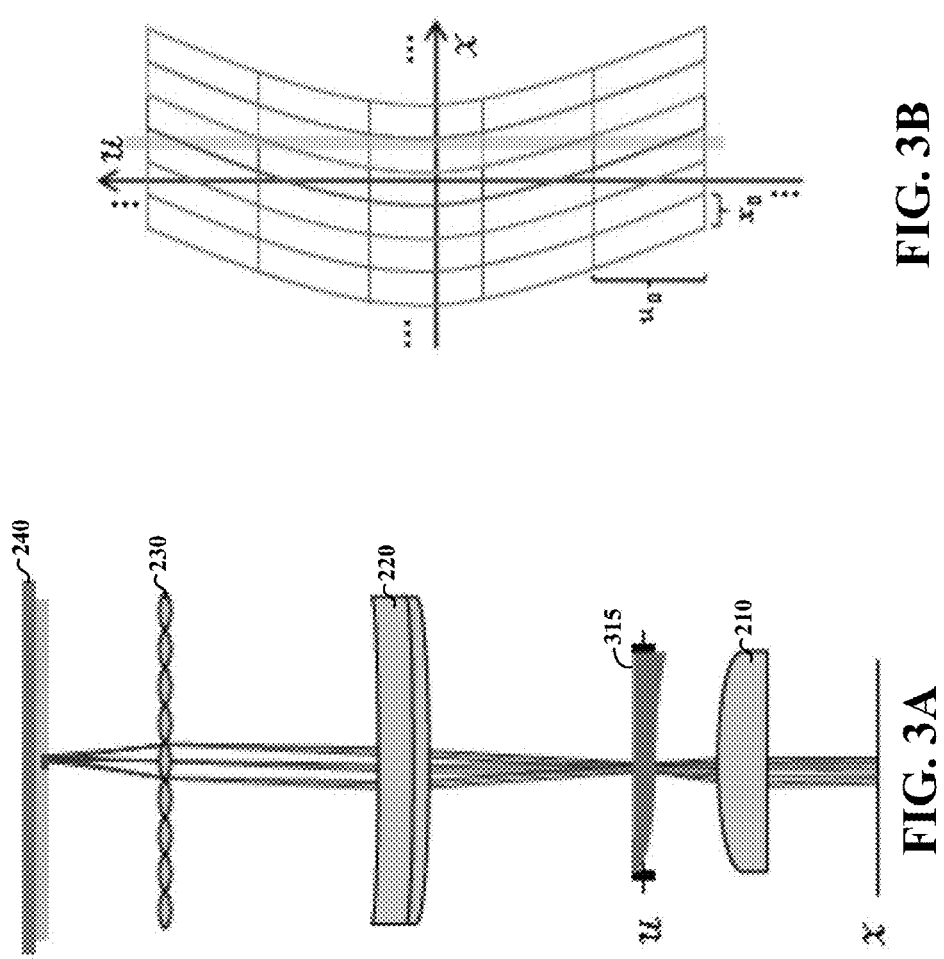

LIGHT-FIELD MICROSCOPY WITH PHASE MASKING

FEDERALLY-SPONSORED RESEARCH AND DEVELOPMENT

This invention was made with Government support under contracts 0964218, 0964204 and 0801700 awarded by the National Science Foundation and under contract MH099647 awarded by the National Institutes of Health. The Government has certain rights in the invention.

BACKGROUND

A variety of imaging approaches are used in different fields. For instance, light field microscopy is an inexpensive, flexible and fast technique for volumetric imaging, such as may involve deconvolution for creating a three-dimensional (3D) volume. A light field microscope (LFM) may, for example, be built from any fluorescence microscope by adding an inexpensive microlens array at the intermediate image plane. The microlens array decomposes incoming light, focusing it onto the image sensor so that light at different field positions and ray angles are recorded by separate sensor pixels. This spatio-angular information, captured in a snapshot of a single instant in time, is a discrete representation of the so-called light field where radiance along rays is measured as a function of position and direction in space. Computational processing of a light field micrograph can yield data products of interest to the microscopist, including images with a computationally adjustable focal plane and depth of field, or pinhole views from any direction within the microscope's numerical aperture (NA) that allows one to see behind occluding objects.

Although light field imaging yields great flexibility in post-processing, recording light through the microlens array may result in sacrificing lateral spatial resolution in order to record angular information. For example, while it can be desirable to record many ray angles (e.g., more than 10 in each dimension of the image), the loss of resolution is proportional to the number of discrete ray angles collected. This represents a considerable resolution loss relative to diffraction-limited performance. Further, non-uniform spatial resolution across a working range, and particularly low spatial resolution around the native object plane, can undesirably affect imaging and resulting images. These and other matters have presented challenges to imaging, for a variety of applications.

SUMMARY

Various example embodiments are directed to methods, apparatuses, systems and other aspects as discussed herein, and may involve addressing one or more of the above challenges.

In accordance with one or more embodiments, the spatial resolution profile of a LFM is improved across z-depths. In some implementations, the problem of non-uniform resolution around the microscope's native object plane is addressed, and performance is enhanced away from the native object plane. For instance, spatial resolution at the native object plane in the middle of the working range of a LFM can be enhanced using phase masks.

One or more embodiments are directed to an apparatus including one or more phase masks that operate with an objective lens and a microlens array to alter a phase characteristic of light travelling in a path. Such a path may, for instance, begin at a specimen and continue through the objective lens and microlens array to a photosensor array. In this context, reconstruction of the specimen from the light field image may be carried out with enhanced spatial resolution characteristics, as provided via the phase masks. These approaches may address issues with low resolution at native object planes, by creating a uniform and high spatial resolution profile across depths in specimen being imaged.

Another embodiment is directed to an apparatus including an objective lens, a microlens element, a phase mask component and one or more optical elements. The phase mask component alters a phase characteristic of light travelling in a path through the objective lens and the microlens element. The one or more optical elements include photosensors that detect light rays received from a specimen via the objective lens, phase mask component and microlens element, and that provide an output indicative of an image of the specimen with spatial resolution characteristics provided via the altered phase characteristic.

Another embodiment is directed to a method as follows. A phase characteristic of light rays is altered using a phase mask component, with the light rays travelling in a path from a specimen through an objective lens and a microlens element. One or more optical elements including photosensors are used for detecting the light rays received from the specimen via the objective lens, phase mask component and microlens element. Using the detected light rays and the photosensors, an output is provided with the output being indicative of an image of the specimen with spatial resolution characteristics provided via the altered phase characteristic.

Various embodiments are implemented in accordance with the underlying provisional application (Ser. No. 62/042,150) to which benefit is claimed and which is fully incorporated herein by reference. For instance, embodiments herein and/or in the provisional application (including the appendices therein) may be combined in varying degrees (including wholly). Reference may also be made to the experimental teachings and underlying references provided in the underlying provisional application, including the appendices that form part of the provisional application. Embodiments discussed in these appendices are not intended, in any way, to be limiting to the overall technical disclosure, or to any part of the claimed invention unless specifically noted.

In more particular embodiments, an optical apparatus includes components that shape a point spread function (PSF) and diffraction pattern of an optical device, such as by shaping the PSF and diffraction pattern on a detector plane of a LFM. The components can be implemented in one or more of the back-focal plane of a microscope's objective, in the native image plane, and as part of a microlens array (e.g., a phase mask in each microlens aperture). Such components may, for example, be implemented as shown in the LFMs shown in Appendix B of the underlying provisional application. Other embodiments are directed to LFMs, and yet other embodiments are directed to methods of analyzing the performance of a LFM with one or more phase masks described herein, to guide the choice of optimal mask parameters.

The above discussion/overview is not intended to describe each embodiment or every implementation of the present disclosure. The Appendices that form part of the underlying provisional application, including the figures and description therein, as well as the description and claims herein also exemplify various embodiments.

DESCRIPTION OF THE FIGURES

Various example embodiments may be more completely understood in consideration of the following detailed description in connection with the accompanying drawings, in which:

FIGS. 2A and 2B respectively show a ray tracing diagram and corresponding ray-space diagram for an LFM apparatus with phase masks at microlens apertures, as may be implemented in accordance with various embodiments;

FIGS. 3A and 3B respectively show a ray tracing diagram and corresponding ray-space diagram for an LFM apparatus with a phase mask at an objective's back focal plane, as may be implemented in accordance with various embodiments;

Figure 1:
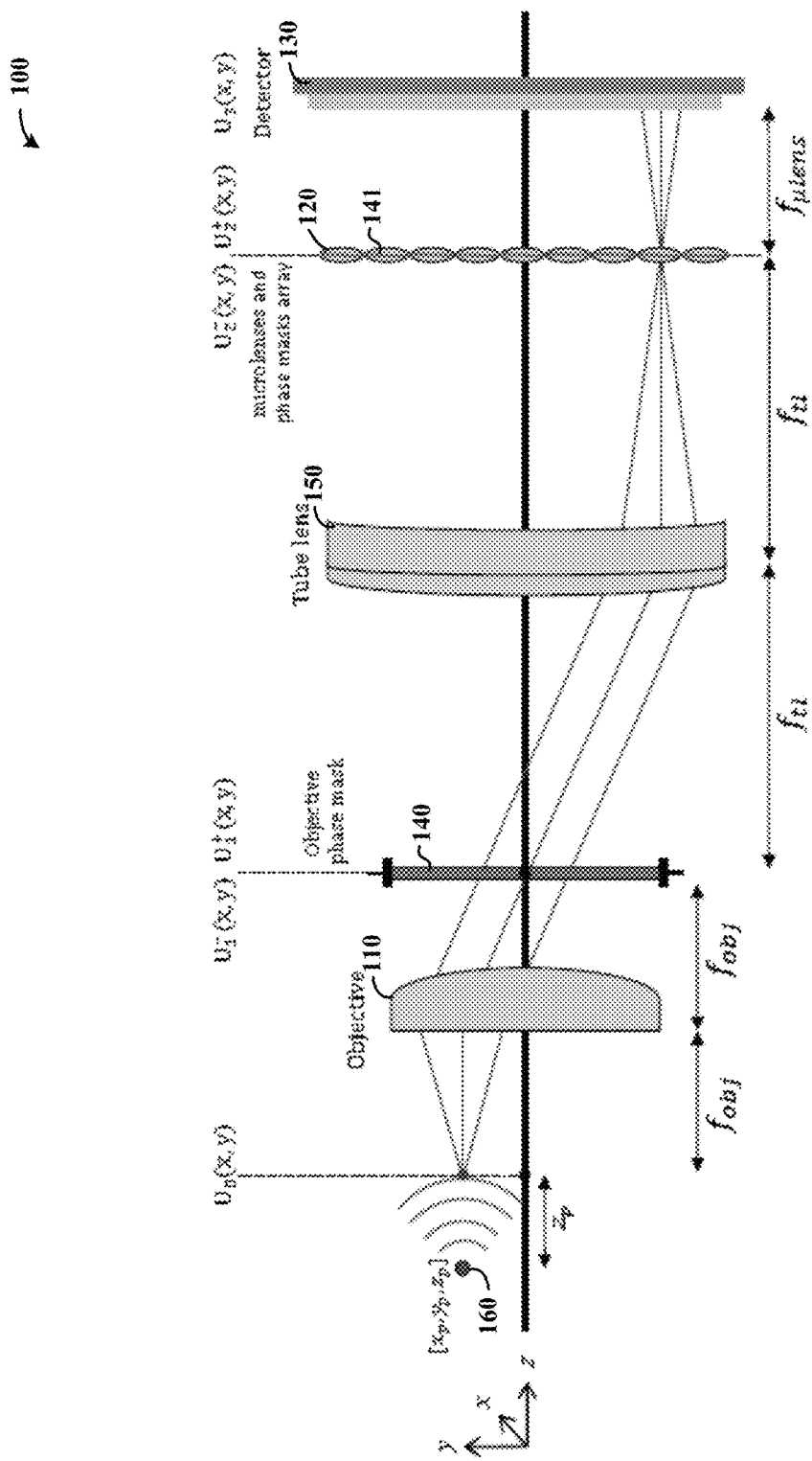
FIG. 1 shows an apparatus with optics including phase masks, in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving imaging using phase masking, and providing an image or images of a specimen with desirable spatial resolution. In certain implementations, aspects of the present disclosure have been shown to be beneficial when used in the context of imaging specimens with an enhanced spatial resolution. These approaches may be carried out in the context of providing enhanced lateral spatial resolution at the native object plane, and/or at z-depths spaced away from the native object plane of a light field microscope. Various aspects are also beneficial for creating a uniform lateral spatial resolution profile across depth for a variety of applications. While not necessarily so limited, various aspects may be appreciated through a discussion of examples using such exemplary contexts.

According to various example embodiments, aspects of the present disclosure are directed to optical phase-masking components and their implementation in an optical path of a light field microscope. The phase-masking components shape the microscope's PSF and diffraction pattern on a detector plane therein. The optical phase-masking components may include, for example, glass or polymer (e.g., a polymer deposited on glass) having a shape that controls sensitivity of a resulting recorded light field's PSF relative to the position of the point source in the volume. This sensitivity directly affects the resulting spatial resolution, with the optical components operating to increase sensitivity of the light field PSF to small changes in the point source position, therein facilitating higher spatial resolution in the reconstruction. For instance, phase masks may be implemented in a microscope in such a manner that object position (depth) is correlated to a particular shape of a PSF. Accordingly, a detected shape can be used to infer a depth position of the object from which the light emanates.

The optical phase-masking components are placed at one or more of the back focal plane of the microscope's objective, the native image plane, or the microlens array (e.g., with a phase mask in each microlens aperture). In certain embodiments, the phase-masking components set uniform spatial resolution across the entire working range of the microscope (e.g., for a z shift of −100 um to +100 um from the native focus plane or for a smaller or larger range of depths), and/or particularly at borders of the working range. In other embodiments, the phase-masking components set uniform spatial resolution over a certain range of z-depths, relative to other z-depths.

Various embodiments are directed to enhancing the performance of light field microscopes using wavefront coding. Phase masks are used in the optical path of the microscope to mitigate non-uniform resolution limitations. In some implementations, two phase masks are used, with one placed at the objective's back focal plane and the other at the microscope's native image plane. In connection with these embodiments, it has been recognized/discovered that the use of two phase masks can provide desirable control over the performance of the light field microscope.

As may be implemented with various embodiments herein, one or more of a variety of phase masks are used to suit particular applications. In some implementations, an extended optical model is used (e.g., for a wavefront coded light field microscope) with related performance metrics to choose an appropriate phase mask. Representative approaches to selecting/designing such phase masks are characterized further herein, as well as in the underlying provisional application referenced above.

Various embodiments are directed to a phase-masking apparatus including processing circuitry that implements a deconvolution algorithm as discussed in the embodiments of Appendix B, with modifications that facilitate the inclusion of one or more phase-masking components at respective locations within the light path. Other embodiments involve analyzing the performance of a light field microscope with one or more such phase-masking components, and setting mask parameters based on the analysis.

A variety of types of microscope applications are implemented with phase masks and/or phase-masking approaches as discussed herein. For instance, light field microscopes that suffer from non-uniform spatial resolution profiles across the range of z-depths and loss of resolution at particular z-depths can be modified to include phase masking aspects. One such implementation involves in-vivo calcium imaging of neural activity, with identification and tracking of single neuron activity. Phase-masking components are used to improve spatial resolution around the native object plane, such as by providing improved or uniform resolution across the entire z-work range, facilitating the identification and tracking of neurons that are located on these planes.

Another implementation involves tracking small fast-moving objects in a volume (e.g., single-molecule tracking) in a light field microscope, by mitigating effects of low spatial resolution via the use of phase masks to provide uniform resolution across some or all of a z-work range of the microscope. This approach can facilitate tracking of the object with a consistent level of accuracy, and which can be achieved across various positions of the object in the microscope's field of view.

In various embodiments, a deconvolution approach as described in Appendix B is implemented in a processor (e.g., executing a programmed algorithm as disclosed therein), which is used together with a light field microscope having phase masks in an optical path thereof. Planes or volumes are reconstructed from a light field image, using these aspects.

Consistent with the above, for information regarding details of other embodiments, experiments and applications that can be combined in varying degrees with the teachings herein, reference may be made to the experimental teachings and underlying references provided in the underlying provisional application, including the appendices that form part of the provisional application, which is fully incorporated by reference. These documents are identified as Appendices A, B and C, and are entitled as follows:
  A. "Enhancing the Performance of the Light Field Microscope Using Wavefront Coding"
  B. "Volume Imaging with Aliased Views"
  C. "Wave Optics Theory and 3-D Deconvolution for the Light Field Microscope"

In addition, for general information regarding microscopy applications, and particularly light field microscopy, and for specific information regarding various microscopes and other components that may be implemented in connection with one or more embodiments, reference may be made to U.S. Pat. No. 7,723,662 (to Levoy, et al.), which is fully incorporated herein by reference. For instance, phase masks as discussed herein may be implemented with the apparatuses shown in FIGS. 1A-1K, or with the processing system as shown in FIG. 2, of the '662 patent.

As characterized herein, a variety of phase masks may be used. In various contexts, one or more phase masks operate to introduce a phase shift in light travelling through the phase mask(s), or otherwise operate to generate interference. Such interference (e.g., corresponding to phase differences between portions of the light) can be used to enhance imaging resolution, such as by improving contrast.

Various embodiments are directed to mitigating non-uniformity of lateral resolution across depth using phase masks in the optical path of an LFM, to produce a more uniform performance across depth, in accordance with one or more of the following aspects. In various contexts, this approach may be referred to as wavefront coding. The PSF of a microscope is shaped for implementation with light field microscopy. In various implementations, these approaches can be incorporated into an optical model and light field deconvolution framework as characterized in Michael Broxton, Logan Grosenick, Samuel Yang, Noy Cohen, Aaron Andalman, Karl Deisseroth, and Marc Levoy, "Wave optics theory and 3-D deconvolution for the light field microscope," Opt. Express 21(21), 25418-25439 (2013), which is fully incorporated by reference.

Phase masks are implemented in a variety of manners. In some embodiments, a single phase mask is placed at the back focal plane of a microscope's objective (referred to herein as an objective mask). In other embodiments, the objective mask is combined with an array of smaller phase masks positioned at the native image plane of the microscope, as an integral part of a microlens array, with such masks being referred to herein as a microlens mask or masks. Such masks can be implemented to improve the LFM resolution profile for reconstructing both 2D planes (off the object native plane) and 3D volumes and create a more uniform resolution profile across z depths. These approaches can solve low-resolution problems around the native object plane, and can create a resolution profile that favors the native object plane over other depths. The objective phase mask can be used to control the size of the PSF at the native image plane that is sampled by the microlenses, and the microlens phase masks shape the PSF at the detector plane so that high frequencies can be resolved over a wide range of depths.

Various embodiments involve an apparatus having an objective lens, microlens element, phase mask(s) and one or more optical elements including photosensors. The microlens element and photosensors may, for example, be implemented in respective microlens and photosensor arrays. The phase mask(s) alters a phase characteristic of light from a specimen, which travels through the objective lens and the microlens element to the photosensors. The photosensors detect the light and provide output image data for the specimen, with the resulting image having spatial resolution characteristics that are enhanced via the altered phase characteristic (e.g., with the phase mask(s) altering the phase characteristic in a PSF the detected light). In certain embodiments, the apparatus also includes a processor circuit that processes the output of the one or more optical elements to provide a two-dimensional or three-dimensional image of the specimen, based on the altered phase characteristic.

The phase mask or masks are implemented in a variety of manners, to suit particular applications. In some implementations, phase mask components are located at both a back focal plane of the objective lens and a native image plane. For instance, a phase mask may be implemented with the objective, at a location in the light path between the objective and the microlenses, and another phase mask may be implemented with the microlenses (e.g., as part of or adjacent the microlenses). In some implementations, a single phase mask is implemented at a back focal plane of the objective lens. For various embodiments, the phase mask component operates with the one or more optical elements to shape a PSF attributable to imaged objects. In a particular implementation, a phase mask sets a size of a PSF at a native image plane sampled by the microlens element, and another phase mask shapes the PSF at a plane in which the at least one optical element lies. A microlens phase mask may be implemented as an array of phase masks, with respective once of the phase masks corresponding to one or more microlenses (e.g., also in an array), and may be integrated into a common component therewith.

In some embodiments, one or more phase masks are implemented using a phase spatial light modulator (SLM), allowing for dynamic, real-time control over the phase function that it implements.

The photosensors may be implemented in a variety of manners, to suit particular applications. In some embodiments, the photosensors detect light rays received at different angles from the specimen via the objective lens and microlens array. The light rays detected by respective sets of the photosensors represent aliased views of the specimen. A processor circuit operates with the photosensor array to reconstruct a deconvolved volume image of the specimen by combining the aliased views based upon overlapping light rays from the different angles in the volume, and characteristics of the phase mask component. In some implementations, the phase mask component alters an intensity distribution in a PSF of a light field provided by the detected light rays; under such conditions the processor circuit may reconstruct the deconvolved volume image based upon the altered intensity distribution.

Various embodiments are directed to method implementations that may involve components as discussed herein.

The phase characteristic may be altered in a variety of manners. In some embodiments, an objective phase mask is used to control the size of the PSF at a native image plane that is sampled by the microlens element, and microlens phase masks are used to shape the PSF at a plane in which the photosensors lie. This approach can be used to resolve high frequency information in light emitted from a wide range of depths in an imaged volume. In some embodiments, an objective phase mask is located between the objective lens and the microlens element, and a microlens phase mask is located at a plane in which the photosensors lie.

In certain embodiments, an intensity distribution is altered in a PSF of a light field provided by the light rays. Light rays are detected and received at different angles from the specimen via the objective lens and microlens array, in which the light rays represent aliased views of the specimen. A deconvolved volume image of the specimen is constructed by combining the aliased views based upon overlapping light rays from the different angles and based upon the altered intensity distribution.

Various embodiments are directed to selecting a phase mask design, consistent with one or more embodiments herein and/or within the underlying provisional application. In some embodiments, the phase mask design or parameters thereof are selected based on Fisher information values for respective phase mask designs. A constraint is used to provide convergence among respective designs from which the design is selected. An objective phase mask is selected so that it sets a PSF at an image plane of the objective that facilitates sampling of the light emitted from an every point in the volume by several microlenses over a predefined depth range of the specimen. A microlens phase mask is selected to control a diffraction pattern on the detector plane of the light rays received from different depths, and in particular, to ensure it can support high frequency information in the pattern generated behind each microlens.

Turning now to the figures, FIG. 1 shows an apparatus 100 with optics including phase masks, in accordance with another embodiment. The apparatus 100 includes an objective lens 110, microlens array 120 and photodetector 130. An objective phase mask 140 is located at/near the objective lens 110, and a microlens phase mask 141 is located at/near the microlens array 120. Certain embodiments employ only one of the phase masks, and various embodiments employ both as shown. Additional optics may also be included, with a tube lens 150 being shown by way of example with the understanding that other optical components can be implemented accordingly. The apparatus 100 may be implemented in a variety of imaging apparatuses, such as in a wavefront coded light field microscope.

By way of example, light rays are shown passing from an object 160, through the objective 110, tube lens 150 and microlens array 120, and being imaged at photodetector 130. The phase masks 140 and/or 141 can be implemented to alter phase characteristics of the light rays, with the resulting light that reaches the photodetector 130 being processed accordingly.

The phase mask 140 is shown located in the back focal plane of the objective lens 110, which may coincide with a telecentric stop for implementation as a doubly-telecentric microscope configuration. Phase mask (or masks) 141 is shown located in the aperture of each microlens in the microlens array 120. These phase masks are implemented in accordance with one or more embodiments herein, and can be selected based upon desired characteristics of resulting images obtained via the apparatus 100.

In various embodiments (as may be implemented with FIG. 1), a 2D plane or a 3D volume is reconstructed from a light field image according to an inverse problem of the form $$f = Hg, \quad (1)$$

where f is the light field image, g is the reconstructed volume (or plane) and H is a measurement matrix modeling the forward imaging process. H is constructed by modeling the propagation of light from a point source in a given location in the volume through the LFM and results in a diffraction pattern on the detector plane 130. The inverse problem is solved numerically by applying a non-blind deconvolution algorithm such as the Richardson-Lucy algorithm. For reference regarding such algorithms, and specific reference to such algorithms as may be implemented in accordance with one or more embodiments, reference may be made to Richardson, William Hadley "Bayesian-Based Iterative Method of Image Restoration," *Journal of the Optical Society of America* 62 (1): 55-59(1972); and Lucy, L. B., "An iterative technique for the rectification of observed distributions," Astronomical Journal 79 (6): 745-754 (1974), both of which are fully incorporated herein by reference.

Various embodiments employ aspects of the optical model characterized in "Wave optics theory and 3-D deconvolution for the light field microscope" as referenced above (e.g., and may be employed in connection with FIG. 1). The model assumes a fluorescence microscope in which an objective and tube lens are set up as a doubly-telecentric 4-f system where the back focal plane of the objective coincides with the tube lens's front focal plane. In certain implementations, the wavefront at the native image plane of the microscope, generated by a point source in the volume, is calculated using scalar diffraction theory for a circular aperture objective. This approach can be accurate for low-NA objectives with an aperture diameter much larger than the wavelength of incoming light, for which polarization effects can be neglected. This wavefront is then multiplied by the transmission function of the microlens array and the result is propagated a distance equal to the focal length of one microlens to the detector plane, where an intensity image is recorded. In order to solve the inverse problem, the optical model is discretized and measurement noise is modeled to have a Poisson distribution (e.g., mostly shot noise). This optical model is further extended to include a phase mask in the back focal plane of the microscope's objective, and phase masks at the apertures of the microlens array. The model takes advantage of the explicit Fourier transform relationship between parallel planes in the microscope, and can be fast to compute numerically. This can be useful in searching for suitable phase masks that improve the performance of the LFM, using a defined performance metric that is based on the forward optical model.

A coordinate system is defined with an origin located on the optical axis at the front focal plane of an objective, which is referred to herein as the native object plane. Positive z values are defined towards the objective, and x and y are spatial coordinates on planes perpendicular to the optical axis and we denote $r=[x,y]^T$. A point source with electric field amplitude A, located at $p=[x_p, y_p, z_p]^T$ in the volume (e.g., 160 as shown in FIG. 1) emits a spherical wavefront that propagates to the front focal plane of the objective. According to the Huygens-Fresnel integral and assuming $r \gg \lambda$, at the front focal plane of the objective we have $$U_0(r, p) = -i\frac{Ak_n z_p}{2\pi r^2}\exp(ik_n r)$$

$$r \triangleq [(x-x_p)^2 + (y-y_p)^2 + z_p^2]^{1/2}$$

$$k_n = \frac{2\pi}{(\lambda/n)}$$

where $k_n$ is the wave number, $\lambda$ is the emission wavelength and n is the index of refraction of the medium through which light propagates (e.g., n=1:33 for simulated/experimental implementations). For point sources that are located off the front focal plane of the objective, the propagation creates a quadratic-phase profile on this plane that is associated with defocus. For general information regarding the Huygens-Fresnel integral and for specific information regarding the implementation of such an integral in connection with one or more embodiments, reference may be made to J. Goodman, "Introduction to Fourier Optics," 2nd ed. (MaGraw-Hill, 1996), which is fully incorporated herein by reference.

The objective and tube lens in a well-corrected, doubly-telecentric microscope can be modeled as 4-f system, such as shown in FIG. 1. The objective's focal length, denoted $f_{obj}$ can be calculated from the known magnification M and the tube lens focal length $f_{tl}$ $$f_{obj} = \frac{f_{tl}}{M}.$$

The transmittance function of an Abbe-sine corrected objective with a circular aperture is given by $$T_{obj}(x, y) = P_{obj}(x, y)(\cos\theta)^{1/2}\exp\left(-i\frac{k}{2f_{obj}}(x^2 + y^2)\right)$$

where $$P_{obj}(x, y) = circ\left(\frac{(x^2+y^2)^{1/2}}{d_{obj}/2}\right)$$

$$\theta \triangleq \sin^{-1}\left(\frac{\lambda(x^2+y^2)^{1/2}}{n}\right).$$

Here, $d_{obj}$ is the diameter of the objective's back aperture and $P_{obj}(r)$ is the objective's pupil function. If desired, $T_{obj}(r)$ can also accommodate any wavefront error that is the result of optical aberrations in the objective, or a quadratic phase term that could be present if the microscope is not arranged in a perfectly telecentric configuration. Under the Fresnel approximation, the wavefront at the objective's front focal plane $U_0(r,p)$, multiplied by the objective's pupil function and the wavefront at the back focal plane of the objective $U_1^-(r,p)$ form a Fourier transform pair (up to a complex scaling factor)

$$U_1^-(r, p) =$$

$$-i\frac{\exp(ikf_{obj})}{\lambda f_{obj}}\int\int U_0(\xi, \eta, p)P_{obj}(\xi, \eta)\exp\left(-i\frac{k}{f_{obj}}(\xi x + \eta y)\right)d\xi\, d\eta$$

where $k=2\pi/\lambda$. In certain wavefront coded LFM designs, a phase mask is placed in the back focal plane of the objective. The phase function that is implemented by the mask multiplies $U_1^-(r)$ as follows $$U_1^+(r,p) = U_1^-(r,p)\exp(i\phi_{obj}(x,y,\Theta_{obj}))$$

where $\Theta_{obj}$ is a vector of parameters that define the shape of the phase function. As an example, the cubic phase mask, which introduces a phase function $\phi_{obj}(x,y)=\alpha(x^3+y^3)$ has only one free parameter $\alpha$, that determines the maximal phase retardation.

In a 4-f telecentric microscope configuration, the back focal plane of the objective coincides with the front focal plane of the tube lens, and therefore the wavefront at the back focal plane of the tube lens $U_2^-(r,p,\Theta_{obj})$, is a scaled Fourier transform of $U_1^+(r,p,\Theta_{obj})$ $$U_2^-(r, p, \Theta_{obj}) =$$

$$-i\frac{\exp(ikf_{tl})}{\lambda f_{tl}}\int\int U_1^+(\xi, \eta, p, \Theta_{obj})P_{tl}(\xi, \eta)\exp\left(-i\frac{k}{f_{tl}}(\xi x + \eta y)\right)d\xi\, d\eta$$

where $P_{tl}(x,y)$ is the pupil function of the tube lens, typically a circle function. $U_2^-(r,p,\Theta_{obj})$ is a scaled, inverted, and blurred (depending on the phase mask function and the objective aperture size) version of the wavefront $U_0(x,y)$, multiplied by the phase function $\phi_{obj}(x,y,\Theta_{obj})$.

The LFM may feature a microlens array at the native image plane of the microscope (where the detector is positioned in a widefield fluorescence microscope). The microlens array acts as a sensing element that enables the recording of both spatial and angular information about the light distribution in the imaged sample. The optical model may include an arbitrary phase function in each microlens aperture. Denoting $T_{se}(x,y,\Theta_{\mu lens})$ the general transmission function of the sensing element, $P_{se}(x,y)$ the aperture function and $Q_{se}(x,y,\Theta_{\mu lens})$ the phase function, the transmission function takes on the form of a rectangular grid, with added phase component that multiplies the quadratic phase of each microlens $$T_{se}(x,y,\Theta_{\mu lens}) = P_{se}(x,y)Q_{se}(x,y,\Theta_{\mu lens})$$

where $$P_{se}(x, y) = rect\left(\frac{x}{d_{\mu lens}}, \frac{y}{d_{\mu lens}}\right) * III(x/p_{\mu lens}, y/p_{\mu lens})$$

$$Q_{se}(x, y, \Theta_{\mu lens}) =$$

$$\exp\left(-i\frac{k}{2f_{\mu lens}}(x^2 + y^2) + \phi_{\mu lens}(x, y, \Theta_{\mu lens})\right) * III(x/p_{\mu lens}, y/p_{\mu lens})$$

Here, $d_{\mu lens}$ is the size of the rectangular aperture of each microlens and $p_{\mu lens}$ is the pitch of the microlens array (or the distance between microlenses, $d_{\mu lens} \leq p_{\mu lens}$). $III(\cdot)$ is the Dirac comb function and * denotes convolution.

$T_{se}(x,y,\Theta_{\mu lens})$ multiplies the incident wavefront $U_2^-(r,p,\Theta_{obj})$. Defined for convenience, $\Theta = [\Theta_{obj}, \Theta_{\mu lens}]^T$ providing $$U_2^+(r,p,\Theta_{obj}) = U_2^-(x,y,\Theta_{obj})T_{se}(x,y,\Theta_{\mu lens}).$$

The wavefront incident on the detector $U_3(r,p,\Theta)$ (e.g., as in FIG. 1), equals to $U_2^+(r,p,\Theta)$ propagated forward the distance between the sensing element and the detector, which can be set to one microlens focal length $f_{\mu lens}$, with $$U_3(r, p, \Theta) = \frac{\exp(tkf_{\mu lens})}{t\lambda f_{\mu lens}} \exp\left(t\frac{k}{2f_{\mu lens}}(x^2 + y^2)\right)$$

$$\iint U_2^+(\xi, \eta, p, \Theta) \exp\left(t\frac{k}{2f_{\mu lens}}(\xi^2 + \eta^2)\right) \exp\left(-t\frac{k}{f_{\mu lens}}(x\xi + y\eta)\right) d\xi d\eta.$$

The resulting incoherent light field PSF at the detector plane is given by the squared modulus of the coherent PSF $$h(r,p,\Theta) = |U_3(r,p,\Theta)|^2.$$

For more details about the discretization of this optical model and the formulation and solution of the reconstruction problem, reference can be made to "Wave optics theory and 3-D deconvolution for the light field microscope" as referenced above.

In various implementations, performance of an LFM design is characterized by calculating the Fisher information of the optical system, based on a defined measure of how the light field PSF changes when the position of a point source translates slightly in the volume. In various contexts, the Fisher information may relate to a measurement of an amount of information that a random variable carries upon an unknown parameter upon which the probability of the random variable depends. Formally, consider the light field PSF h(r,p,Θ) observed at the detector plane. Normalized properly, h(r,p,Θ) can be regarded as a two-dimensional probability density function, defined over the detector area, which depends on the unknown parameters vector p. The Fisher information matrix $\mathscr{F}(p,\Theta)$ with respect to the unknown point source position p, from the observed light field PSF $$\mathscr{F}(p, \Theta) = \begin{bmatrix} \mathscr{F}_{x_p x_p}(p, \Theta) & \mathscr{F}_{x_p y_p}(p, \Theta) & \mathscr{F}_{x_p z_p}(p, \Theta) \\ \mathscr{F}_{y_p x_p}(p, \Theta) & \mathscr{F}_{y_p y_p}(p, \Theta) & \mathscr{F}_{y_p z_p}(p, \Theta) \\ \mathscr{F}_{z_p x_p}(p, \Theta) & \mathscr{F}_{z_p y_p}(p, \Theta) & \mathscr{F}_{z_p z_p}(p, \Theta) \end{bmatrix} \quad (2)$$

where $$\mathscr{F}_{ij}(p, \Theta) = \iint \left(\frac{\partial^2 \ln \hat{h}(r, p, \Theta)}{\partial i \partial j}\right) \hat{h}(r, p, \Theta) dr$$

$$\hat{h}(r, p, \Theta) = \frac{h(r, p, \Theta)}{\iint h(r, p, \Theta) dr}.$$

Each element of the Fisher information matrix is the second moment of the efficient score (the gradient of the log-likelihood function) of the PSF relative to a certain direction of movement of the point source in the volume. It holds information about how the light field PSF changes when the point source position moves slightly in that direction, or in other words, how sensitive the light field PSF is to the point source position.

Phase masks are selected in accordance with various embodiments, based on Fisher information values implemented for designing and/or optimizing a design. For high Fisher information values, the light field PSF is sensitive to the exact position of the point source in the volume. Slight shifts in the point source position in the volume may result in a significant, detectable change in the light field PSF recorded on the detector. For low Fisher information values, the recorded light field PSF appears about the same on the detector, regardless of small shifts in the point source position in the volume. In various implementations, optimization schemes are constrained and directed to provide convergence, such as characterized in FIGS. 7 and 8 of Appendix A. For instance, for an entire range of z depths the extent of the PSF at the native image plane of the LFM can be made large enough so that it is sampled by several microlenses, but not too large so that it remains sensitive to the exact position of the point source in the volume. For a wavefront coded LFM, this can be implemented by optimizing an objective phase mask, which affects the extent of the PSF at the native image plane where the microlens array is located. The diffraction pattern created by the microlenses and phase masks can be set to support high spatial frequencies over the entire depth range. This can be achieved by optimizing the phase mask(s) at the microlenses to control the diffraction pattern at different depths.

In various embodiments, a combination of phase masks are designed to maximize a performance metric that is based on the Fisher information matrix in Eq. (2) above. The performance metric is a weighted sum of the Fisher information matrix elements $$J(p, \Theta) = \sum_i \sum_j \omega_{ij} \mathscr{F}_{ij}(p, \Theta).$$

In this metric, $\omega_{ij}$ are coefficients that weight the contribution of each element of the matrix, which facilitates normalizing the contributions from all directions of movement, or weighting lateral components differently than longitudinal components in the z direction, along the optical axis of the system. The final metric is the sum of J (p, Θ) across all p positions. This sum may be a weighted sum, so that certain p positions are allocated higher weights and other p positions are allocated lower weights. The performance metric may also be defined as $$\max_{\Theta} \min_{p \in s_p} \lambda_p \sum_i \sum_j \omega_{ij} \mathscr{F}_{ij}(p, \Theta).$$

In this metric, $\lambda_p$ are weights for the different spatial positions p. In various embodiments, two phase mask positions are used in this regard, and in other embodiments, additional phase masks are used.

A variety of types of phase masks may be used. For instance, a spiral mask or a cubic phase mask may be implemented at the back focal plane of the objective, one or both of which may be coupled with an additional array of cubic phase masks located at apertures of the microlenses. The spiral phase mask may, for example, be implemented as a continuous version of the phase function proposed in S. Prasad, "Rotating point spread function via pupil-phase engineering," Opt. Lett. 38(4), 585-587 (2013), which is fully incorporated herein by reference. The mask may be defined in polar coordinates to be $$\phi_{obj}(x,y) = \alpha(x^2 + y^2)\arctan(y/x)$$

where the parameter α controls the maximal phase retardation the mask creates and x and y are normalized coordinates. The mask has two components: a radial component of quadratic phase which is associated with defocus and an angular component that is simply the angle in radians at a given position on the back focal plane, relative to the x=0 axis. Intuitively, each angular component of the mask (a ray from the center of the mask on the optical axis along a radius at a certain angle relative to x=0) introduces a quadratic phase which focuses light to a single spot on the optical axis. The continuous angular dependency spreads these spots evenly in z. The resulting asymmetric PSF at the native image plane of the LFM remains the same size across a wide range of depths, but rotates around a center point. A value of $\alpha=200\pi$ may be implemented and which, according to the Fisher information-based metric above, gives good performance over a depth range of 200 µm. Over this entire range, the PSF rotates about $1:667\pi$ radians about the center point. The mask can also be defined as $$\varphi_{obj}(x,y)=\alpha(x^2+y^2)\sin(\arctan(y/x)/\beta).$$

In this case, β is another free parameter that determines the distribution of light across z for every radial component.

Embodiments involving cubic masks at the back focal plane of the objective, as well as cubic masks at the aperture of the microlenses, may be implemented as follows. Phase masks may be added to the microlenses to provide additional degrees of freedom and control over the shape of the light field PSF. With a cubic phase mask at its aperture the point spread function of each microlens becomes a cubic PSF. Using a value of $\alpha=5$ for the free parameter of the mask, phase masks at the microlenses and an objective mask can significantly improve the resolution of the LFM around the native object plane.

FIGS. 2A and 2B, 3A and 3B, and 4A and 4B show respective pairs of ray tracing diagrams and corresponding ray-space diagrams for three LFM apparatuses, as may be implemented in accordance with various embodiments. Each figure shows an objective lens 210, tube lens 220, microlens array 230, and photodetector 240. Common reference numbers are used in the respective figures for common components. However, various embodiments employ different components (e.g., different types of objective lenses, microlenses, or other optics). The objective and microlens phase masks spread the rays differently: ray bundles from each point on the detector are refracted by the microlens masks so that their intersections with the u-plane form a parabolic profile. The objective phase mask on the other hand, introduces different phases to ray bundles that intersect at different positions over the back focal plane, so that their positions on the x-plane form a parabolic profile.

Beginning with FIG. 2A, light rays are altered using microlens phase masks 235, as represented in FIG. 2B. Using the microlens cubic phase masks, rays traced from each point on the detector are spread by the phase mask and intersect the u-plane at positions that form a parabolic profile. In u-x space as shown in FIG. 2B, each pixel covers the same area $d_{\mu lens}=M_{obj}$ on the x-plane as would be covered without phase masks, but exhibit a parabolic profile in u (this profile is the sum of many shifted parabolic profiles, each produced by a different point inside the pixel's integration area on the detector). The parabolic curvature depends on the power of the cubic phase masks.

In FIG. 3A, light rays are altered using an objective phase mask 315, as represented in FIG. 3B. Pixels that sample the object cover partially overlapping areas on x, with the added spatial information providing higher spatial resolution in the reconstruction. Placing a cubic phase mask in the objective's back focal plane (with no microlens phase masks) however, changes the intersection of rays with the x-plane. Backward-traced rays from every point on the detector intersect the u-plane at a single point, and are spread on the x-plane over the same area size. Groups of rays coming from different points within a pixel area intersect the u-plane at different positions, are refracted differently by the phase mask and are therefore spaced according to a parabolic profile on the x-plane. Summing the contributions from all points within a pixel results in a parabolic profile on the x-plane as shown in FIG. 3B. When using an objective cubic mask, the resulting light field PSF spreads over several microlenses. As such, an object on the native object plane is sampled by pixels under several microlenses, which collect light from different, partially overlapping spatial positions on x. The additional spatial information can be used to reconstruct the object's position with higher spatial accuracy than the native resolution of the LFM.

Figures 4A, 4B:
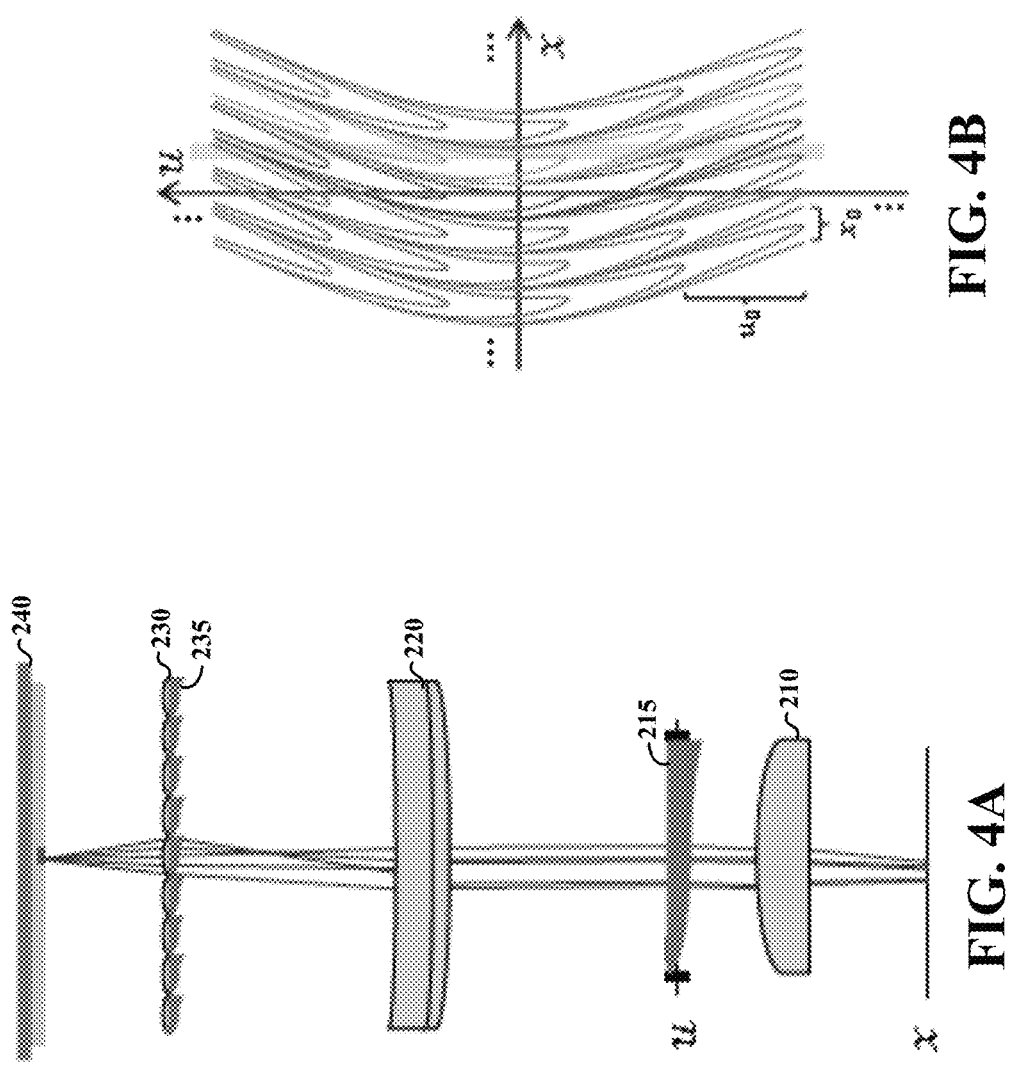
FIGS. 4A and 4B respectively show a ray tracing diagram and corresponding ray-space diagram for an LFM apparatus with a phase mask at the objective's back focal plane and phase masks at microlens apertures, as may be implemented in accordance with various embodiments.

In FIG. 4A, light rays are altered using both an objective phase mask 315 and microlens phase mask 235, providing for sampling of the object by more pixels relative to using only an objective mask as in FIG. 3A, resulting in light rays as shown in FIG. 4B and enhanced spatial resolution in the ensuing reconstruction. Using objective and microlens masks together, the light rays are refracted by both masks and result in parabolic profiles on both u and x-planes. The resulting sampling pattern of the detector pixels as shown in FIG. 4B shows that more pixels sample the object on the native object plane, relative to that shown in FIG. 3B. Higher spatial resolution can be achieved using the greater diversity of positions and angles of rays in the measurement of the native object plane, and using a cubic phase mask such that each microlens PSF can support higher spatial frequencies for that plane.

Figure 5:
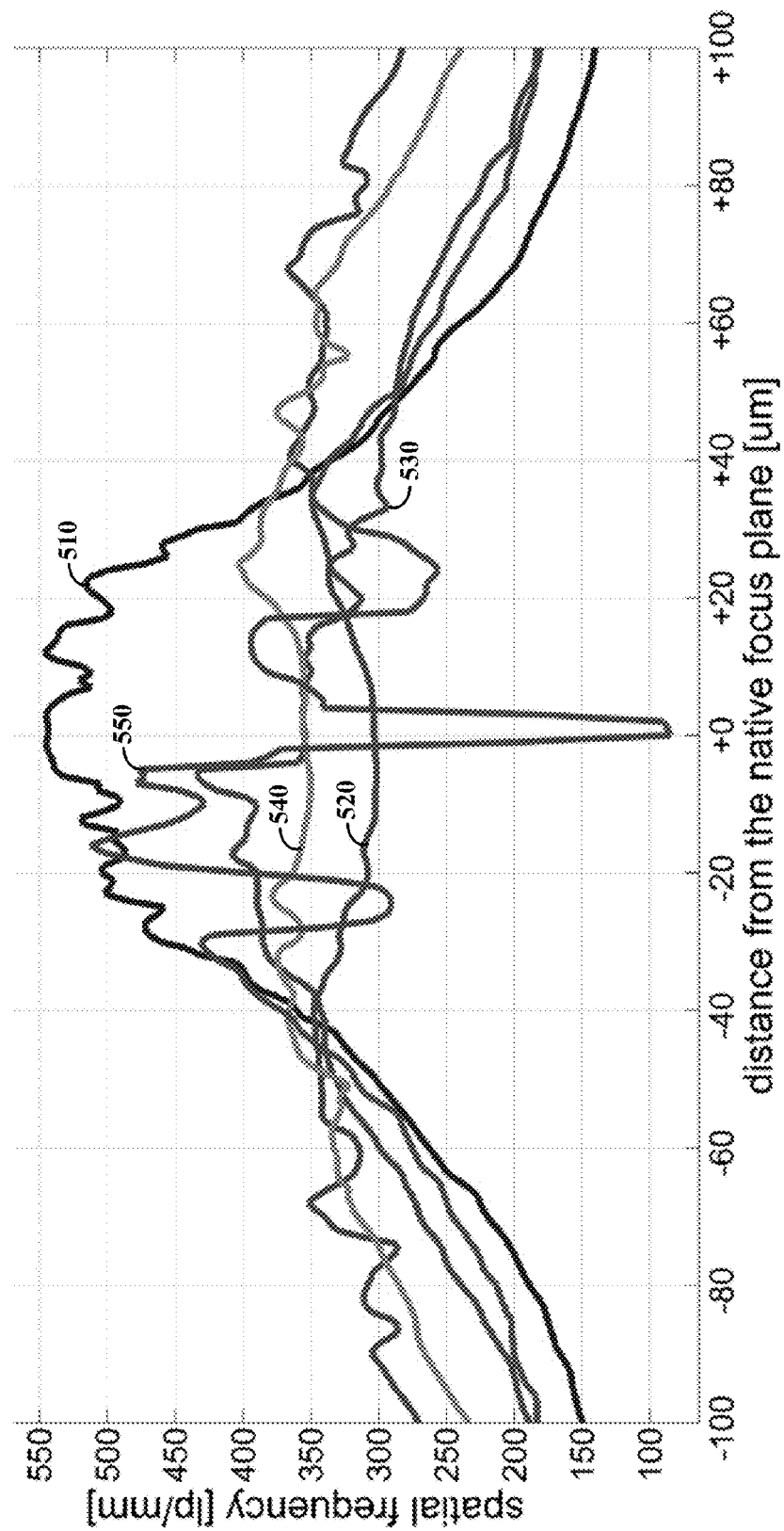
FIG. 5 shows respective limiting resolution plots for various phase mask combinations, as may be implemented in accordance with one or more embodiments.

FIG. 5 shows respective plots for various phase mask combinations, as may be implemented in accordance with one or more embodiments. The vertical axis shows spatial frequency, and the horizontal axis shows distance from a native focus plane (e.g., of a microscope in which the phase masks are implemented). Plot 510 shows an embodiment in which a cubic objective phase mask and a cubic microlens phase mask are implemented together. Plot 520 shows an embodiment in which a spiral objective mask is used with a cubic microlens mask, with uniform weighting. A cubic objective lens is used without a microlens mask in plot 530. In plot 540, a spiral objective mask is again used with a cubic microlens mask (or masks), but with center weighting. For reference, plot 550 shows results without using phase masks.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., phase masking, light sampling, combining light rays). For example, in certain of the above-discussed embodiments, one or more modules are discrete logic circuits or programmable logic circuits configured and arranged for implementing these operations/activities, as in FIG. 5A of Appendix B, a processor type circuit with the microscope in FIG. 2A of Appendix B and/or as may be connected to sensors 216, 226 or 236, or to the various other sensors shown in other figures (e.g., logic circuit 350). These operations/activities may, for example, further include phase-masking approaches as discussed herein (including in Appendix A). In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., non-volatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, various imaging approaches and related approximations as described herein may be implemented together or separate, and various phase-masking approaches as described above or in Appendix A may be implemented with the components shown in Appendix B. Many different types of optical arrangements, including those shown by way of example in the figures, may be implemented with the approaches described herein. For instance, different types of phase masks than those shown in Appendix A may be used, criteria for analyzing the performance of a LFM with phase masks can be modified, the phase masks as shown can be placed in different locations such as described in Appendix A, and phase masks can be implemented using a phase SLM instead of a physical phase mask.

In various more detailed/experimental embodiments, the phase masks are implemented using phase SLMs, and the phase functions that the phase SLMs implement are selected to match some properties of the imaged specimen. In specific applications, it has been discovered that this realizes improved volume reconstruction. In more specific related embodiments, the determination of such phase masks involves an analysis step followed by a synthesis step, in which the specimen may be imaged with a certain combination of phase masks. As one example a spiral objective phase mask is used to enable uniform spatial lateral resolution across the imaged depth range, a volume is reconstructed and the properties of the imaged specimen are analyzed. In the synthesis step for such related embodiments, a phase function is determined that best fits the specimen. In one such embodiment, for example the phase mask is designed to resolve higher spatial frequencies at depths in which the specimen shows fine-grained features with high spatial frequency content. The phase function is then implemented by the phase SLM. The above-noted realizations follow from the specimen being imaged again with the new, better matched phase function, a volume being reconstructed from the image, and the resolution being further analyzed in order to further optimize the phase function, using the phase SLM.

In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. An apparatus comprising:
an objective lens;
a microlens element;
a phase mask component configured and arranged to alter a phase characteristic of light travelling in a path through the objective lens and the microlens element, wherein the phase mask component is separate from the microlens element and also located along the path; and
at least one optical element including photosensors configured and arranged to detect light rays received from a specimen via the objective lens, phase mask component and microlens element, and to provide an output indicative of an image of the specimen with spatial resolution characteristics provided via the altered phase characteristic wherein the photosensors are configured and arranged to detect light rays received at different angles from the specimen via the objective lens and microlens array, the light rays detected by respective sets of the photosensors representing aliased views of the specimen and further including a processor circuit configured and arranged with the photosensors to reconstruct a deconvolved volume image of the specimen by combining the aliased views detected by the sets of photosensors based upon overlapping light rays from the different angles in the volume and based upon characteristics of the phase mask component.

2. The apparatus of claim 1, wherein the phase mask component includes a first phase mask located at a back focal plane of the objective lens, and a second phase mask at a native image plane of the apparatus.

3. The apparatus of claim 2, wherein the first phase mask is configured and arranged with the microlens element to set a size of a point spread function (PSF) at a native image plane sampled by the microlens element, and the second phase mask is configured and arranged to shape the PSF at a plane in which the at least one optical element lies.

4. The apparatus of claim 2, wherein the second phase mask includes an array of phase masks.

5. The apparatus of claim 1, wherein the phase mask component is configured and arranged to alter the phase characteristic in a PSF of a light field provided by the light rays detected at the at least one optical element.

6. An apparatus comprising:
an objective lens;
a microlens element;
a phase mask component configured and arranged to alter a phase characteristic of light travelling in a path through the objective lens and the microlens element;
at least one optical element including photosensors configured and arranged to detect light rays received from a specimen via the objective lens, phase mask component and microlens element, and to provide an output indicative of an image of the specimen with spatial resolution characteristics provided via the altered phase characteristic;
wherein the photosensors are configured and arranged to detect light rays received at different angles from the specimen via the objective lens and microlens array, the light rays detected by respective sets of the photosensors representing aliased views of the specimen; and
further including a processor circuit configured and arranged with the photosensors to reconstruct a deconvolved volume image of the specimen by combining the aliased views detected by the sets of photosensors based upon overlapping light rays from the different angles in the volume and based upon characteristics of the phase mask component.

7. The apparatus of claim 6, wherein
the phase mask component is configured and arranged to alter the phase characteristic by altering an intensity distribution in a PSF of a light field provided by the light rays detected at the at least one optical element, and the processor circuit is configured and arranged to reconstruct the deconvolved volume image of the specimen based upon characteristics of the phase mask component by reconstructing the deconvolved volume image based upon the altered intensity distribution.

8. The apparatus of claim 1, wherein the phase mask component includes a phase mask located at a back focal plane of the objective lens and configured and arranged to provide a PSF at a native image plane that:
   has the same size for all positions of a point source in a volume of the specimen, and
   exhibits different shapes for different depths of the point source in the volume.

9. The apparatus of claim 1, wherein the phase mask component is configured and arranged with the at least one optical element to shape a point spread function attributable to objects imaged via the apparatus.

10. The apparatus of claim 1, further including a processor circuit configured and arranged to process the output of the at least one optical element, to provide a two-dimensional or three-dimensional image of the specimen, based on the altered phase characteristic.

11. The apparatus of claim 1, wherein the phase mask component is configured and arranged to alter the phase characteristic by altering an intensity distribution in a PSF of a light field provided by the light rays detected at the at least one optical element.

12. The apparatus of claim 1, wherein the microlens element includes a microlens array.

13. The apparatus of claim 1, wherein the at least one optical element includes a photosensor array.

14. The apparatus of claim 1, wherein each of the microlens element and the phase mask component are integrated in a single optical element, and the phase mask component is configured and arranged to provide a phase function that is different from a phase function provided by the microlens element.

15. A method comprising:
   using a phase mask component, altering a phase characteristic of light rays travelling in a path from a specimen through an objective lens and a microlens element, wherein the phase mask component is separate from the microlens element and also located along the path;
   using at least one optical element including photosensors, detecting the light rays received from the specimen via the objective lens, phase mask component and microlens element; and
   via the detected light rays and the photosensors, providing an output indicative of an image of the specimen with spatial resolution characteristics provided via the altered phase characteristic wherein altering the phase characteristic includes altering an intensity distribution in a PSF of a light field provided by the light rays;
   wherein detecting the light rays includes detecting light rays received at different angles from the specimen via the objective lens and microlens array, the light rays representing aliased views of the specimen; and further including reconstructing a deconvolved volume image of the specimen by combining the aliased views based upon overlapping light rays from the different angles and based upon the altered intensity distribution.

16. The method of claim 15, wherein altering the phase characteristic includes
   using an objective phase mask to control the size of a point spread function (PSF) at a native image plane that is sampled by the microlens element, and
   using microlens phase masks to shape the PSF at a plane in which the photosensors lie, therein resolving high frequency light over a wide range of depths.

17. The method of claim 15, wherein altering the phase characteristic includes altering the phase characteristic with an objective phase mask located between the objective lens and the microlens element, and further altering the phase characteristic with a microlens phase mask at a plane in which the photosensors lie.

18. A method comprising:
   using a phase mask component, altering a phase characteristic of light rays travelling in a path from a specimen through an objective lens and a microlens element;
   using at least one optical element including photosensors, detecting the light rays received from the specimen via the objective lens, phase mask component and microlens element; and
   via the detected light rays and the photosensors, providing an output indicative of an image of the specimen with spatial resolution characteristics provided via the altered phase characteristic, wherein altering the phase characteristic includes altering an intensity distribution in a PSF of a light field provided by the light rays;
   wherein detecting the light rays includes detecting light rays received at different angles from the specimen via the objective lens and microlens array, the light rays representing aliased views of the specimen; and
   further including reconstructing a deconvolved volume image of the specimen by combining the aliased views based upon overlapping light rays from the different angles and based upon the altered intensity distribution.

19. The method of claim 15, further including selecting a design for the phase mask component based on Fisher information values for respective phase mask designs, by
   using a constraint to provide convergence among respective designs from which said design is selected, and
   selecting said design including an objective phase mask that sets a PSF at an image plane of the objective that facilitates sampling of the light rays by several microlenses over a predefined depth range of the specimen, and including a microlens phase mask that controls a diffraction pattern of the light rays received from different depths.

20. An apparatus including one or more phase masks configured and arranged to operate with an objective lens and a microlens array to alter a phase characteristic of light travelling in a path from a specimen, through the objective lens and microlens array and to a photosensor array, therein providing imaging of the specimen with uniform spatial resolution characteristics at various depths as provided via the altered phase characteristic wherein the photosensors are configured and arranged to detect light rays received at different angles from the specimen via the objective lens and microlens array, the light rays detected by respective sets of the photosensors representing aliased views of the specimen and further including a processor circuit configured and arranged with the photosensors to reconstruct a deconvolved volume image of the specimen by combining the aliased views detected by the sets of photosensors based upon overlapping light rays from the different angles in the volume and based upon characteristics of the phase mask component.

* * * * *